United States Patent
Pechin et al.

(10) Patent No.: US 11,899,846 B2
(45) Date of Patent: Feb. 13, 2024

(54) CUSTOMIZABLE GESTURE COMMANDS

(71) Applicant: Hewlett-Packard Development Company, L.P., Spring, TX (US)

(72) Inventors: Andrew Pornthep Pechin, Austin, TX (US); Kishore Venkat Rao Goka, Austin, TX (US); Nhu Quynh Pham Nguyen, Austin, TX (US); Srinivas Bommareddy, Austin, TX (US); Raghavendra Balavalikar Krishnamurthy, Austin, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/587,966

(22) Filed: Jan. 28, 2022

(65) Prior Publication Data

US 2023/0244315 A1    Aug. 3, 2023

(51) Int. Cl.
   *G06V 40/10*    (2022.01)
   *G06F 3/01*     (2006.01)
   (Continued)

(52) U.S. Cl.
   CPC ............. *G06F 3/017* (2013.01); *G06F 3/165* (2013.01); *G06V 10/82* (2022.01); *G06V 40/10* (2022.01); *G06V 40/28* (2022.01)

(58) Field of Classification Search
   CPC .............. G06F 21/45; G06F 21/6209; G06F 2221/2131; G06F 7/588; G06F 16/23; G06F 16/9554; G06F 3/014; G06F 3/017; G06F 1/1684; G06F 1/169; G06F 1/1692; G06F 2203/0383; G06F 2203/04104; G06F 3/011; G06F 3/048; G06F 3/0482; G06F 3/0486; G06F 3/04883; G06F 3/04886; G06F 1/1686; G06F 1/32; G06F 11/1417; G06F 11/1441; G06F 21/121; G06F 21/316; G06F 21/604; G06F 2203/011; G06F 2221/2141; G06F 3/012; G06F 3/0236; G06F 3/0237;
   (Continued)

(56) References Cited

U.S. PATENT DOCUMENTS 10,412,442 B1 * 9/2019 Evans ..................... A63F 13/20
11,082,661 B1 * 8/2021 Pollefeys ................. H04N 7/15
(Continued)

OTHER PUBLICATIONS

Sriram, S.K. et al., "GESTOP: Customizable Gesture Control of Computer Systems"; In 8th ACM IKDD CODS and COMAD (CODS COMAD 2021), Jan. 2-4, 2021, Bangalore, India (5 pages). available at <https://arxiv.org/pdf/2010.13197.pdf>.

(Continued)

*Primary Examiner* — Rayeez R Chowdhury
(74) *Attorney, Agent, or Firm* — Quarles & Brady LLP

(57) ABSTRACT

A method implements customizable gesture commands. The method includes constructing a set of gesture containers and training a machine learning model, for a gesture container of the set of gesture containers, to detect a performance of a video gesture. The method further includes detecting the performance of the video gesture, from a gesture container of the set of gesture containers, in a video stream using the machine learning model. The method further includes executing, in response to detecting the video gesture, a command assigned to the video gesture by the gesture container.

20 Claims, 11 Drawing Sheets

(51) Int. Cl.
*G06F 3/16* (2006.01)
*G06V 10/82* (2022.01)
*G06V 40/20* (2022.01)

(58) Field of Classification Search
CPC ............. G06F 3/04817; G06F 3/04842; G06F 3/04847; G06F 40/274
See application file for complete search history.

(56) References Cited

U.S. PATENT DOCUMENTS

| | | | | |
|---|---|---|---|---|
| 11,288,543 | B1* | 3/2022 | Tovchigrechko | G06V 10/82 |
| 11,373,352 | B1* | 6/2022 | Gafni | G06T 11/60 |
| 2006/0010400 | A1* | 1/2006 | Dehlin | G06V 40/28 |
| | | | | 715/856 |
| 2014/0152540 | A1* | 6/2014 | Franck | G06F 3/017 |
| | | | | 345/156 |
| 2018/0081447 | A1* | 3/2018 | Gummadi | G06F 3/167 |
| 2018/0218283 | A1* | 8/2018 | Jenson | G06Q 50/01 |
| 2018/0260031 | A1* | 9/2018 | Lin | G06F 3/0485 |
| 2019/0354194 | A1* | 11/2019 | Wang | G06V 10/82 |
| 2020/0051303 | A1* | 2/2020 | Li | G06T 13/40 |
| 2021/0174604 | A1* | 6/2021 | Long | G16H 30/40 |
| 2021/0247846 | A1* | 8/2021 | Shriram | G06T 19/006 |
| 2022/0350415 | A1* | 11/2022 | Jatti | G06F 3/017 |
| 2023/0012125 | A1* | 1/2023 | Coddaire | C12M 41/00 |

OTHER PUBLICATIONS

Gesture: "Create and Detect Custom Gestures on React Native"; Nov. 6, 2020 (14 pages). <https://reactnativeexample.com/create-and-detect-custom-gestures-on-react-native/>.
Stack Overflow: "Gesture Detection Algorithm based on Discrete Points"; Dec. 29, 2013 (7 pages). <https://stackoverflow.com/questions/20821358/gesture-detection-algorithm-based-on-discrete-points>.
Microsoft Research: "Project Gesture"; Apr. 28, 2021 (3 pages). <https://www.microsoft.com/en-us/research/project/gesture/>.
Wolfe, B.M.; iMORE: "How to Use Assistive Touch on iPhone and iPad"; Jul. 9, 2021 (18 pages). <https://www.imore.com/how-use-assistivetouch-iphone-and-ipad>.
Buckell, F., Maketecheasier: "How to Add Custom Gestures on Android"; Jun. 1, 2017 (8 pages). <https://www.maketecheasier.com/add-custom-gestures-android/>.
Sanhz, J., MakeUseOf: "Quickly Access Apps and Shortcuts with Custom Gestures for Android"; Jun. 16, 2017 (8 pages). <https://www.makeuseof.com/tag/access-apps-shortcuts-custom-gestures-android/>.
SETAPP: "How to Use Hidden, Time-saving MacOS Multi-touch Gestures on Mac"; Apr. 30, 2021 (21 pages). <https://setapp.com/how-to/customize-trackpad-gestures-on-mac>.
Ramsley, E., Android: Gadget Hacks "Use Custom Waving Gestures to Unlock Your Phone Like a Crazy Person"; May 18, 2016 (3 pages). <https://android.gadgethacks.com/how-to/use-custom-waving-gestures-unlock-your-phone-like-crazy-person-0171161/.

* cited by examiner

CUSTOMIZABLE GESTURE COMMANDS

BACKGROUND

Video conferencing systems display and distribute media streams (video and audio) to let users at remote location communicate visually and audibly. Video conferencing systems support a wide variety of user commands that are hidden from the user to prevent overloading the user interface. Recognition of video gestures may allow for additional control inputs, but different users may not be able to perform the same gestures. A challenge is to use video gestures that have been customized by users to control video conferencing systems.

SUMMARY

In general, in one or more aspects, the disclosure relates to a method implementing customizable gesture commands. The method includes constructing a set of gesture containers and training a machine learning model to detect a performance of a video gesture. The method further includes detecting the performance of the video gesture, from a gesture container of the set of gesture containers, in a video stream using the machine learning model. The method further includes executing, in response to detecting the video gesture, a command assigned to the video gesture by the gesture container.

In general, in one or more aspects, the disclosure relates to a server implementing customizable gesture commands. The server includes a construction application to construct a set of gesture containers, each gesture container comprising command data and model data. The server further includes a training application to train a machine learning model, for a gesture container of the set of gesture containers, to detect a performance of a video gesture. The server further includes a detection process to detect the performance of the video gesture, from the gesture container of the set of gesture containers, in a video stream using the machine learning model. The machine learning model includes a gesture model. The server further includes an execution process to execute, in response to detection of the video gesture, a command assigned to the video gesture by the gesture container.

In general, in one or more aspects, the disclosure relates to an endpoint that uses customizable gesture commands. The endpoint includes: a camera to receive a set of training images used to train a machine learning model to detect a performance of a video gesture; an application to detect the performance of the video gesture in a video stream by the machine learning model; and an execution process to execute, in response to detecting the video gesture, a command assigned to the video gesture by a gesture container.

Other aspects of the invention will be apparent from the following description and the appended claims.

DETAILED DESCRIPTION

In general, embodiments of the disclosure are directed to a system that can learn and recognize user customized gestures to control video conferencing systems. Disclosed embodiments include a user interface that records video gestures from an individual user and trains machine learning models to recognize the video gestures. Multiple machine learning models may be used. In one embodiment, a unique machine learning model is trained for each video gesture. In one embodiment, one machine learning model is trained to recognize multiple video gestures. The trained machine learning models are used by the system to recognize the video gesture during live video conferences to control the video conferencing system. For example, after recognizing a video gesture, the system may mute the microphone and the camera of a video conferencing endpoint.

Figure 1A:
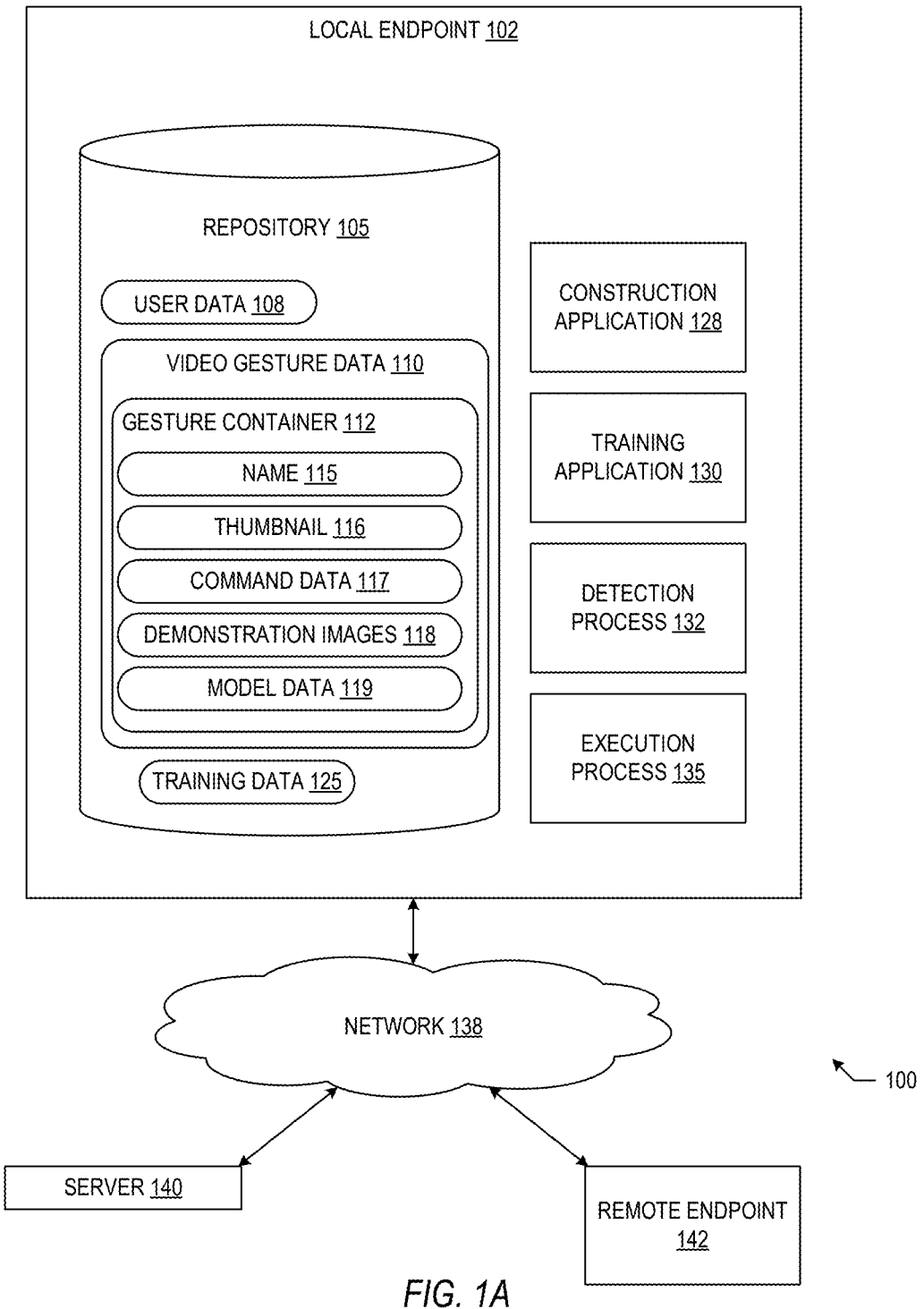
FIG. 1A and FIG. 1B show diagrams of systems in accordance with disclosed embodiments.
Figure 1B:
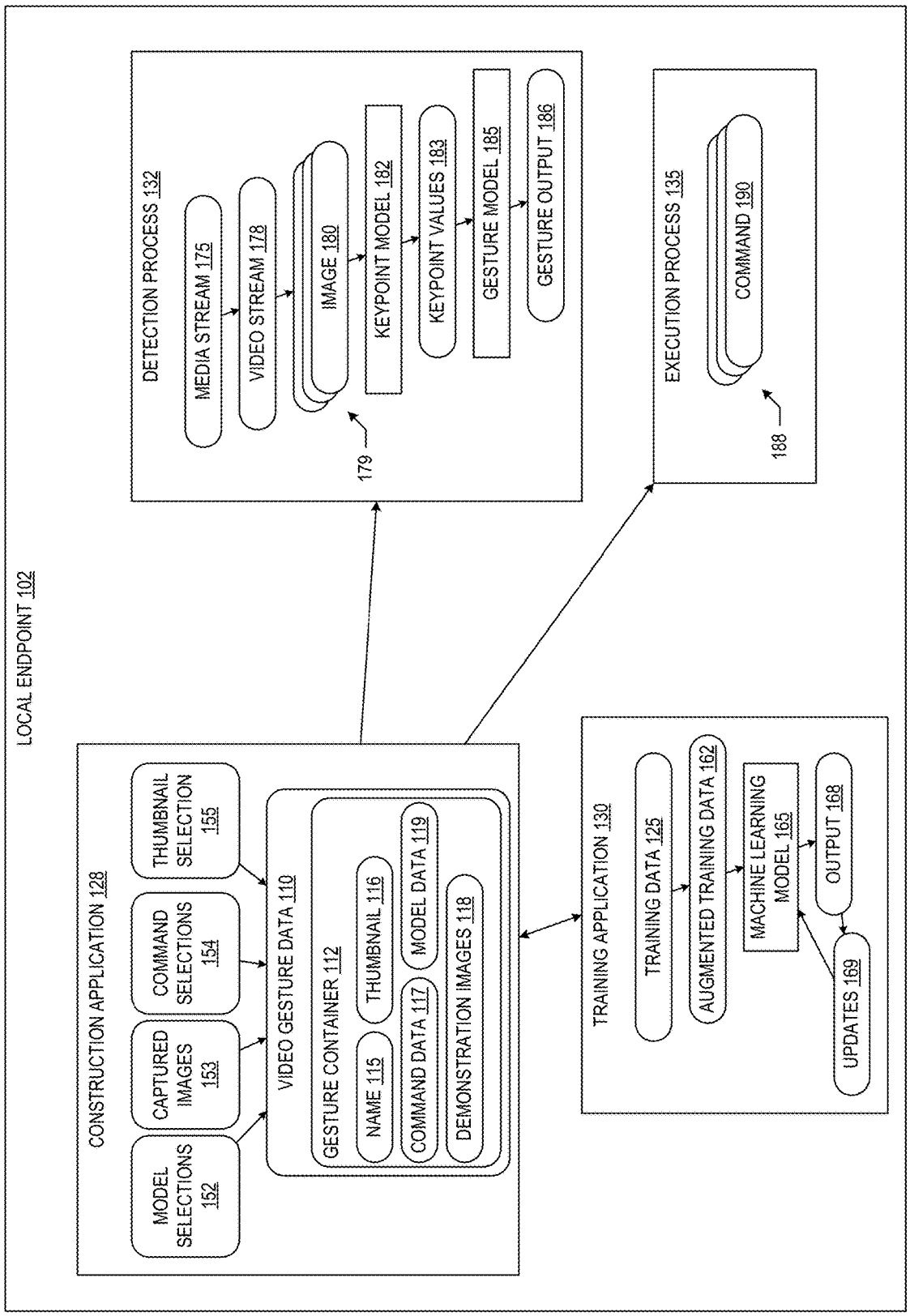

FIG. 1A illustrates a video conferencing system that uses customizable gesture commands. FIG. 1B illustrates the applications and programs for creating and using customizable gesture commands.

Turning to FIG. 1A, the system (100) includes the local endpoint (102), which may be a mobile device, a laptop computer, a desktop computer, etc. The local endpoint (102) is operated by a user to create and use customizable gesture commands. The local endpoint (102) includes the repository (105), the construction application (128), the training application (130), the detection process (132), and the execution process (135).

The repository (105) is a component of the local endpoint (102). The repository (105) stores the user data (108), the video gesture data (110), and the training data (125).

The user data (108) is data that is unique to a user of the local endpoint (102). The user data (108) includes information about the different gestures a user has customized for use during a video conference. Each different user may have a customized set of gestures, thumbnails, machine learning models, etc.

The video gesture data (110) includes the data of the video gestures (i.e., the customizable gesture commands) for a user. The video gesture data (110) stores video gestures in gesture containers (including the gesture container (112)), which are the collections of data. For each video gesture, the video gesture data (110) includes a gesture container, e.g., the gesture container (112).

The gesture container (112) is the collection of data for one video gesture. The gesture container (112) includes the name (115), the thumbnail (116), the command data (117), the demonstration images (118), the model data (119), etc.

The name (115) is a user generated string that identifies the video gesture. The name (115) is received by the local endpoint (102) in response to input from the user and is displayed by the local endpoint (102) to identify the gesture to the user.

The thumbnail (116) is an image that represents and identifies the video gesture in the user interface of the local endpoint (102). The thumbnail (116) may be generated from one of the demonstration images (118).

The command data (117) identifies the one or more commands to invoke in response to detecting the video gesture. The command data (117) may include a list of commands that is executed to control the video conference between the local endpoint (102) and the remote endpoint (142). The commands may be invoked by the local endpoint (102) and executed by the local endpoint (102), the server (140), or the remote endpoint (142).

The demonstration images (118) are a set of images or image sequences that demonstrate a video gesture. The demonstration images (118) may include multiple examples of the video gesture being performed by the user. Video gestures may be static or dynamic. A static video gesture is recognizable from a single image and does not require movement of the user while performing the gesture. A dynamic video gesture is recognizable from a sequence of images in which the user is moving between the images to perform the dynamic video gesture. In one embodiment, the demonstration images (118) may be removed after a model is trained on the demonstration images.

The model data (119) includes data for the machine learning models used to recognize the video gesture in a video conference. The model data (119) may include the machine learning model or a reference to the machine learning model. In one embodiment, one video gesture corresponds to one machine learning model. In one embodiment, multiple gestures may be recognized by one model with the model having unique outputs for each gesture. When one model identifies multiple gestures, the model data (119) may identify the model and the output from the model that corresponds to a particular video gesture.

The training data (125) is the data used to train the machine learning models of the system (100) to recognize the gestures of the users of the local endpoint (102). The training data (125) may include the demonstration images (118) from the video gesture data (110). In one embodiment, the training data (125) includes keypoint values generated from the demonstration images (118). The training data (125) also includes augmented training data generated from the demonstration images (118). The augmented training data may be generated using affine transforms of the demonstration images (118) and of the keypoint values and may be generated using generative adversarial networks (GANs).

The construction application (128) is the application that constructs the video gesture data (110) for the video gestures of the users of the local endpoint (102). The construction application (128) constructs the video gesture data (110) in response to receiving data from users, which includes selections and images.

The training application (130) trains the machine learning models used by the system (100). The training application (130) uses supervised learning based on the training data (125). The training application (130) uses machine learning algorithms to train the machine learning models. In one embodiment, backpropagation and gradient descent is used to update the weights of the models.

The detection process (132) is part of a program that detects a video gesture during a video conference. In one embodiment, the detection process (132) detects the gesture from images from a video stream extracted from a live media stream being broadcast during a video conference between the local endpoint (102) and the remote endpoint (142).

The execution process (135) is part of a program that executes the commands from the commands data (117) for a gesture. The execution process (135) is triggered in response to the video gesture being recognized by the detection process (132). The execution process (135) may perform multiple commands to control a video conference in response to a single gesture being recognized. For example, the execution process (135) may execute commands to control the zoom of a camera, the direction of a camera, the tracking features of a camera, the muting of cameras and microphones, etc.

The construction application (128), the training application (130), the detection process (132), and the execution process (135) may each operate on the local endpoint (102), on the server (140), or on combinations thereof. For example, the construction application (128) may be part of a web based application hosted by the server (140). The training application (130) may execute on the server (140) to reduce the amount of time for training the machine learning models. The detection process (132) and the execution process (135) may also be part of a web application hosted by the server (140) and accessed with the local endpoint (102).

The network (138) connects the local endpoint (102), the server (140), and the remote endpoint (142). In one embodiment, the network (138) uses internet protocol (IP) to transfer packets between endpoints and servers (including the local endpoint (102), the server (140), and the remote endpoint (142)) to facilitate a video conference between users of the local endpoint (102) and the remote endpoint (142).

The server (140) is a computing system that facilitates a video conference between the local endpoint (102) and the remote endpoint (142).

In one embodiment, the server (140) is used by the local endpoint (102) to set up a video conference with the remote endpoint (142). In one embodiment, the server (140) may host distributed versions of the construction application (128), the training application (130), the detection process (132), and the execution process (135).

The remote endpoint (142) is another endpoint that may be at a different location from the local endpoint (102). The remote endpoint (142) may be a laptop computer, a desktop computer, etc. The remote endpoint (142) is connected to the local endpoint (102) through the network (138) to establish a video conference between the remote endpoint (142) and the local endpoint (102).

Turning to FIG. 1B, the local endpoint (102) creates and uses customizable gesture commands. The local endpoint (102) includes the construction application (128), the training application (130), the detection process (132), and the execution process (135). The construction application (128), the training application (130), the detection process (120), and the execution process (122) may run locally on the local endpoint (102) or be run as distributed applications and processes being executed on a server (e.g., the server (140) of FIG. 1A) with user interfaces displayed on the local endpoint (102) for interaction with a user.

The construction application (128) generates the gesture container (112) of the video gesture data (110) from the model selections (152), the captured images (153), the command selections (154), and the thumbnail selections (155).

The model selections (152) include selections about a machine learning model. The model selections (152) may include selections for the type of machine learning model and the type of gesture to be recognized by the machine learning model. The types of machine learning models may include facial models, hand models, and body models, which are keypoint models that identify the locations of keypoints (e.g., facial landmarks, hand joints, body joints, etc.) based on an input image. The type of gesture may be static or dynamic. Static video gestures may be recognized from a single image. Dynamic video gestures may be recognized from a sequence of images.

Additionally, the model selections (152) may identify an accuracy or an amount of training time for a model for a gesture. For example, a user may select to generate a less accurate model that may be trained more quickly over a more accurate model that requires lengthy training time.

The captured images (153) form the demonstration images (118). The captured images (153) may be generated from a camera of the local endpoint (102) and displayed to the user. The captured images (153) may include multiple images for a static video gesture and multiple sequences of images for a dynamic video gesture.

The command selections (154) form the command data (117). The user may select multiple commands that may be invoked in response to a video gesture. Additionally, the user may provide the name (115).

The thumbnail selection (155) forms the thumbnail (116). In one embodiment, the thumbnail selection (155) identifies one of the captured images (153) to be used as a thumbnail. The thumbnail may be generated rescaling the selected image to a lower resolution.

The training application (130) trains the machine learning model (165) using the training data (125). The training data (125) includes the demonstration images (118) for a video gesture. The training application (130) augments the training data (125) by generating the augmented training data (162).

The augmented training data (162) is additional training data generated from the training data (125). The augmented training data (162) may be generated using multiple algorithms, which include using affine transforms, using generative adversarial networks, etc.

The use of affine transforms involves applying affine transformation to the original data (e.g., the demonstration images (118) or the keypoint values generated therefrom) to generate the augmented training data. The affine transformations include transformations for translating, reflecting, scaling, rotating, shearing, etc., the original data by different amounts to generate augmented data. For example, the demonstration images (118) may include three original images to which 300 different affine transforms are each applied to generate 900 augmented images for a total of 903 images to train the machine learning model (165). In one embodiment, the affine transforms may be applied to the keypoint values (which were generated from the demonstration images (118)) to generate the augmented training data (162).

The use of generative adversarial networks involves training a generative network and an adversarial network. The generative network generates sets of augmented data (e.g., an augmented training image or augmented keypoint values) that are evaluated by the adversarial network. The adversarial network is trained to identify data that is not original data, i.e., to identify data generated by the generative network. As training progresses, the generative network becomes better at generating data that cannot be distinguished from real data by the adversarial network and the adversarial network becomes better at distinguishing between real data and data generated by the generative network.

The machine learning model (165) is the model used by the detection process (132) to identify a video gesture from an image or sequence of images. The machine learning model may include multiple models. The machine learning model (165) may include one or a combination of the keypoint model (182) and the gesture model (185). In one embodiment, machine learning model (165) includes both the keypoint model (182) and the gesture model (185) and updates both models during training. In one embodiment, the machine learning model (165) may include the gesture model (185) without the keypoint model (182) and update the gesture model (185) without updating the keypoint model (182). The machine learning model (165) generates the outputs (168) from the training data (125) (including the augmented training data (162)).

The output (168) is the output from the machine learning model (165). The output (168) identifies the gesture associated with the gesture container (112). The training application (130) uses the output (168) to generate the updates (169).

The updates (169) are updates to the machine learning model (165) to make the machine learning model (165) more accurate. In one embodiment, the updates (169) are generated by the training application (130) by comparing the output (168) with labels from the training data (125) (and the augmented training data (162)) to identify the error in the output (168). The error is then backpropagated through the machine learning model (165) using gradient descent to update the weights of the machine learning model (165).

The detection process (132) detects gestures of a user of the local endpoint (102) during a video conference. The detection process (132) accesses the media stream (175) to detect a video gesture.

The media stream (175) is a stream of live data between the local endpoint (102) and the remote endpoint (142) (of FIG. 1A). The media stream (175) includes multiple streams of audio and video. For example, the media stream (175) includes the video stream (178).

The video stream (178) is a stream of video captured by the local endpoint (102). The video stream (178) is extracted from the media stream (175) and is the source of the images (179).

The images (179) (including the image (180)) are images captured by the local endpoint (102) that are analyzed by the detection process (132) for the presence of the video gesture defined by the gesture container (112). The images (179) are input to the keypoint model (182).

The keypoint model (182) is a machine learning model that generates keypoint values (183) from an input image (e.g., the image (180)). Embodiments of the keypoint model may use regression tree algorithms, ensemble of regression tree algorithms, neural network algorithms, etc., to generate the keypoint values (183) from the image (180). The keypoint model (182) may be a two-dimensional model or a three-dimensional model. A two-dimensional model generates keypoint values that include two-dimensional coordinates and identify the locations in a two-dimensional plane. A three-dimensional model generates keypoint values that include three-dimensional coordinates and identify the locations in a three-dimensional space. Generally, keypoint values identify locations of anatomical landmarks on a human body, including on the face, hands, and other body parts. The keypoint model (182) may be a facial model, a hand model, a body model etc.

A facial model generates keypoint values that identify facial landmarks. For example, facial landmarks identify particular locations of parts of a face, including eyes, eyebrows, nose, mouth, jaw, ears, etc.

A body model generates keypoint values that identify (or correlate to) locations of a human body. For example, keypoint values may correspond to locations of shoulders, elbows, hands, necks, hips, knees, feet, etc.

A hand model generates keypoint values that identify (or correlate to) locations of a human hand. For example, keypoint values may correspond to locations of wrists, knuckles, fingers, etc., for right or left hands.

The keypoint model (182) may include multiple keypoint models. For example, the keypoint model (182) may include a facial model, a body model, and a hand model that each generate outputs that are combined to form the keypoint values (183). In one embodiment, outputs from multiple models are concatenated together to form the keypoint values (183). In one embodiment, the keypoint model (183) may be a single model that provides outputs for face, body, and hands.

The keypoint values (183) are output from the keypoint model (182). The keypoint values (183) may include two-dimensional data or three-dimensional data that identify the relative locations of parts of a human body (including the face and hands). For recognition of video gestures, the relative positioning of the keypoint values (facial landmarks, body joints, hand joints, etc.) provide the information learned by the gesture model (185) to identify the video gestures. The keypoint values (183) are input to the gesture model (185).

The gesture model (185) is a machine learning model that generates gesture output (186) from the keypoint values (183). Embodiments of the gesture model (185) may use support vector machine algorithms, neural network algorithms, etc., to generate the gesture output (186) from the keypoint values (183).

In one embodiment, the video gesture is a static video gesture, and the gesture model (185) is a support vector machine. The support vector machine receives the keypoint values (183) generated from the image (180) and generates the gesture output (186).

In one embodiment, the video gesture is a dynamic video gesture, and the gesture model (185) is a neural network model with a recurrent neural network, e.g., a long short term memory (LSTM). The LSTM receives the keypoint values (183) as one of a sequence of keypoint values generated from the sequence of images (179) to generate the gesture output (186). In one embodiment, the output of the LSTM is input to a fully connected layer that generates the gesture output (186).

The gesture output (186) identifies the presence of a gesture from the keypoint values (183). In one embodiment, the gesture output (186) is a single floating point value between 0 and 1 that indicates the presence (e.g., with values closer to "1") or not (values closer to "0") of the gesture associated with the gesture container (112). In one embodiment, the gesture output (186) is a vector with an element for each gesture that may be recognized by the gesture model (185).

In one embodiment, in response to the gesture output (186), the detection process (132) may create a detection event. The detection event is a message that identifies the gesture that has been detected by the detection process (132), which may be sent to the execution process (135).

The execution process (135) executes commands in response to a video gesture being detected. The execution process (135) retrieves the commands (188) from the command data (117) of the gesture container (112) for the gesture that is detected.

The commands (188) (including the command (190)) include commands that may control the local endpoint (102), the remote endpoint (142) (of FIG. 1A), the video conference between the local endpoint (102) and the remote endpoint (142), etc. For example, the commands may mute audio from an endpoint, mute video from an endpoint, zoom to a speaker in a video stream from an endpoint, turn on camera tracking to follow the speaker, disconnect the call, add a new participant to the call, etc.

FIGS. 2A through 2D show flowcharts of processes in accordance with the disclosure.

Figure 2A:
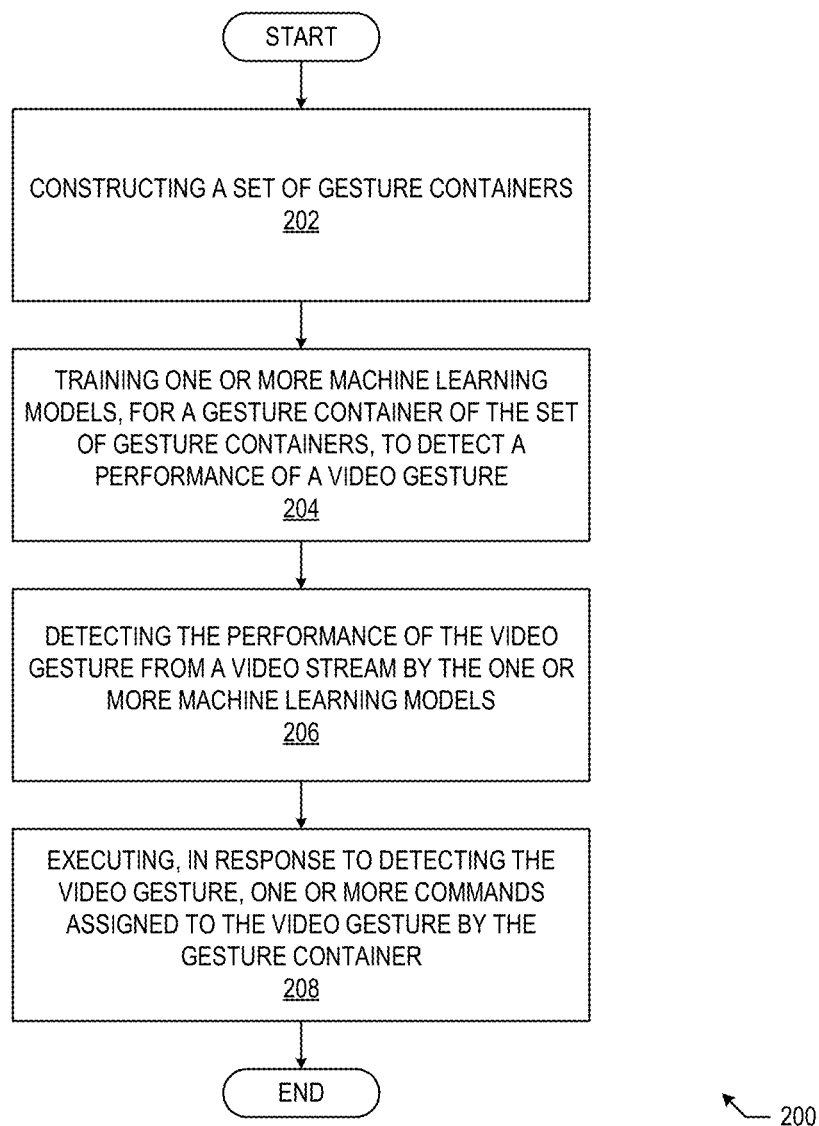
FIG. 2A, FIG. 2B, FIG. 2C, and FIG. 2D show flowcharts in accordance with disclosed embodiments.

Turning to FIG. 2A the process (200) constructs and uses customizable video gestures. The process (200) may be performed by a combination of one or more and servers. In one embodiment, a server may host a website that performs the steps as part of a distributed application running on one or more servers. In one embodiment, an endpoint may perform the steps as part of a native application running on the endpoint.

At Step 202, a set of gesture containers is constructed. An example of constructing gesture containers is presented in FIG. 2B. Continuing with FIG. 2A, the set may include one or more gesture containers that are associated with video gestures in a one-to-one relationship. Each gesture container contains the data used by the system to identify and recognize a video gesture. The construction of a gesture container is in response to receiving selections from a user that may identify the type of gesture (and corresponding machine learning model), the commands linked to the gesture, the images demonstrating the gesture, etc.

At Step 204, one or more machine learning models are trained to detect a performance of a video gesture. An example of training the machine learning model is presented in FIG. 2C. Continuing with FIG. 2A, the machine learning models are trained with training data that includes augmented training data. The machine learning models may be trained using backpropagation, gradient descent, etc.

At Step 206, the performance of the video gesture is detected in a video stream by the one or more machine learning models. An example of detecting the video gesture is presented in FIG. 2D. Continuing with FIG. 2A, the video stream is from a media stream of a live video conference between multiple endpoints.

At Step 208, in response to detecting the video gesture, one or more commands assigned to the gesture by the gesture container are executed. In one embodiment, a server may execute the command (e.g., to zoom a camera) by sending instructions to an endpoint that performs the instructions. In one embodiment, the commands may be performed locally by an endpoint.

In one embodiment, the commands may include a command to mute an audio stream and a command to mute a video stream. In one embodiment, the commands may include a command to zoom a view towards the location of the video gesture, i.e., to zoom in to the person that performed the video gesture, and a command to initiate a tracking function for the view to track and stay with the person that performed the video gesture.

Figure 2B:
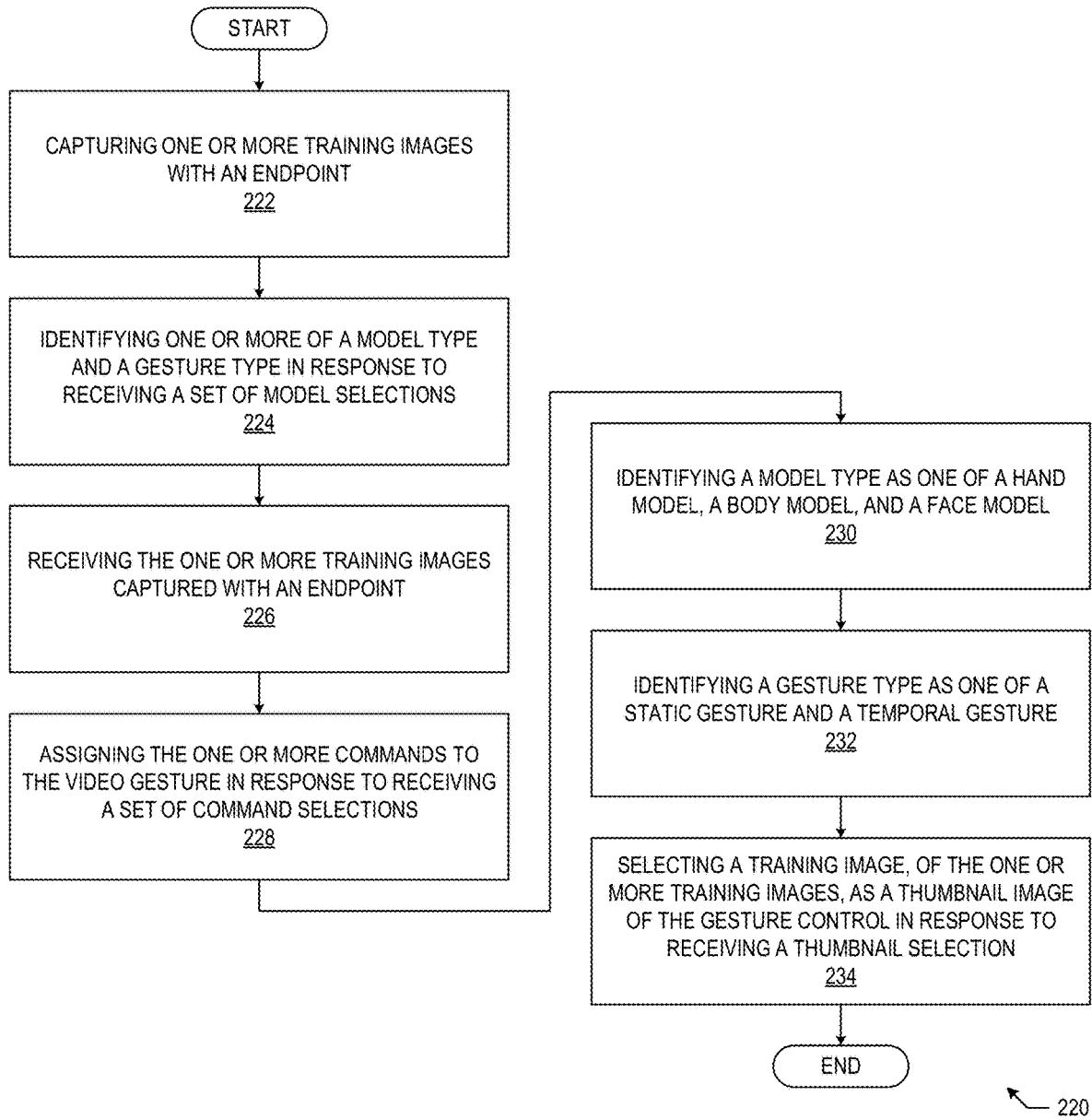

Turning to FIG. 2B, the process (220) extends Step 202 (of FIG. 2A) of constructing gesture containers. Each video gesture may correspond to a gesture container and the set of gesture containers forms video gesture data.

At Step 222, one or more training images are captured with an endpoint. The training images are captured with a camera of the endpoint. When performed by a server, the server may send a message to the client device with instructions to capture the training images. The training images depict performance of the video gesture. A user interface of the endpoint may guide the user through the process of performing the video gesture multiple times to provide multiple training images or sequences of training images that demonstrate the video gesture.

At Step 224, model types and gesture types are identified in response to receiving a set of model selections. The model types include face, body, and hand models. The gesture types include static and dynamic gestures. Static gestures do not include movements of the user and may be defined from a single image. Dynamic gestures include movement of a user and may be defined using multiple images to illustrate the movement. The endpoint may display a user interface that guides the user through the selection of the types.

At Step 226, the training images captured with the endpoint are received. The training images may be received by a server and stored in the gesture container for the video gesture.

At Step 228, commands are assigned to the gesture in response to receiving a set of command selections. The commands are assigned by being stored to the gesture container. The command selections may identify multiple commands that are to be executed in response to the video gesture being recognized. The instruction for executing the commands may be identified from the command selections to generate command data. In one embodiment, the command selections include a first command to mute an audio stream of an endpoint and a second command to mute a video stream of an endpoint. In one embodiment, the command selections include a first command to zoom a view towards a location of the video gesture and a second command to initiate a tracking function to track (i.e., follow) the person that performed the video gesture.

At Step 230, a model type is identified as one of a hand model, a body model, and a face model. In one embodiment, the model type may be identified in response to the model selections.

At Step 232, a gesture type is identified as one of a static gesture and a temporal gesture. In one embodiment, the gesture type may be identified in response to the model selections. In one embodiment, the static gesture is linked to a support vector machine and the temporal gesture is linked to a long, short term memory (LSTM).

At Step 234, a training image is selected as a thumbnail image of the gesture container. The training image may be selected in response to receiving a thumbnail selection as a user input from an endpoint.

Figure 2C:
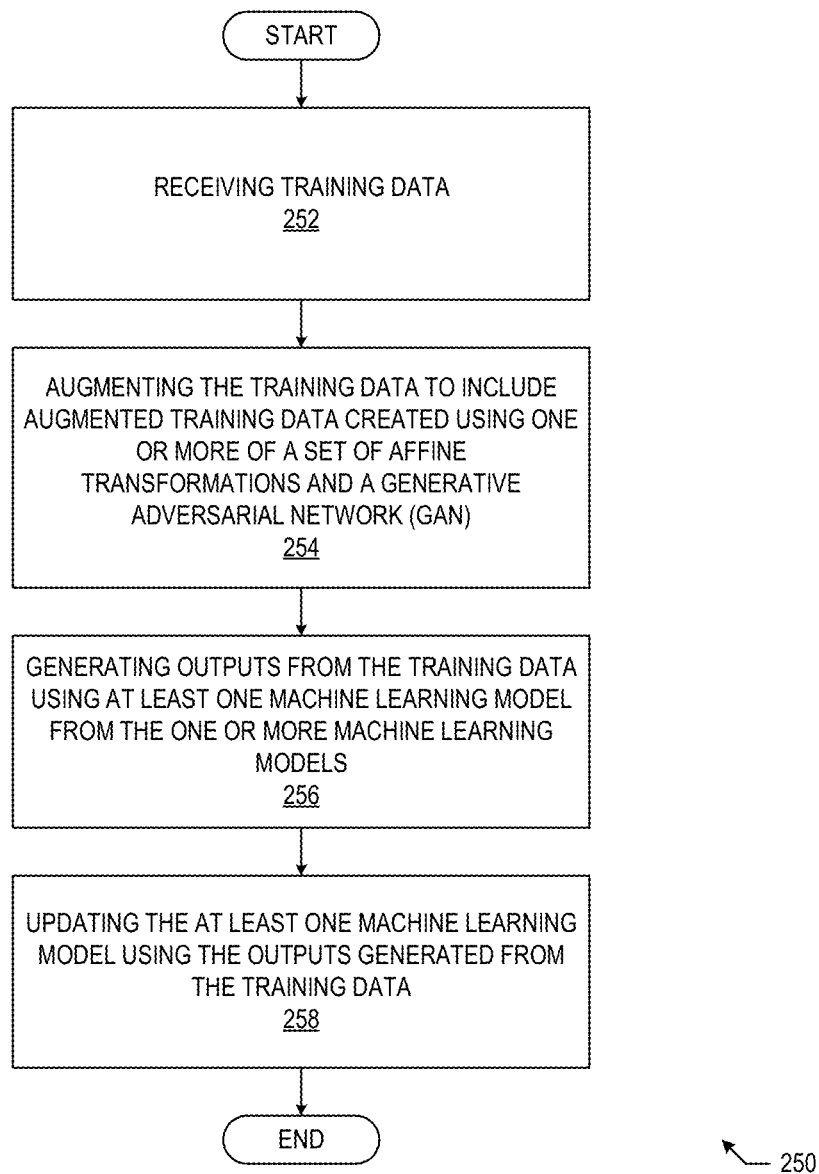

Turning to FIG. 2C, the process (250) extends Step 204 (of FIG. 2A) of training machine learning models. One or more machine learning models are trained by the system. The machine learning models may include keypoint models that generate two-dimensional or three-dimensional keypoint values as outputs.

At Step 252, training data is received. The training data may include training images (also referred to as demonstration images) that demonstrate the video gesture. In one embodiment, the training data includes keypoint values generated from the training images, which may be used to train a gesture model (for identifying a video gesture) without training a keypoint model (for identifying the locations of keypoints from an image).

At Step 254, the training data is augmented to include augmented training data. The augmented training data may be created using a set of affine transformations, a generative adversarial network (GAN), etc. The affine transformations modify the original data (i.e., the original training images or the keypoint values identified from the original training images) to translate, reflect, scale, rotate, shear, etc., the original data and form the augmented training data. The generative adversarial network generates new data with a generative network that may be checked against the original data with the adversarial network to form the augmented training data.

At Step 256, outputs are generated from the training data using at least one machine learning model. The machine learning models may include keypoint models (that identify keypoints from images) and gesture models (that identify the presence of a video gesture from keypoint values). The machine learning models use machine learning algorithms, which may include regression tree algorithms, ensemble algorithms, support vector machine algorithms, neural network algorithms, etc.

At Step 258, updating at least one machine learning model using the outputs generated from the training data. The updates may be generated by measuring the error of the output of a model to a label and then updating the weights or parameters of the model based on the error. Different algorithms may be used, including regression, backpropagation, gradient descent, etc.

Figure 2D:
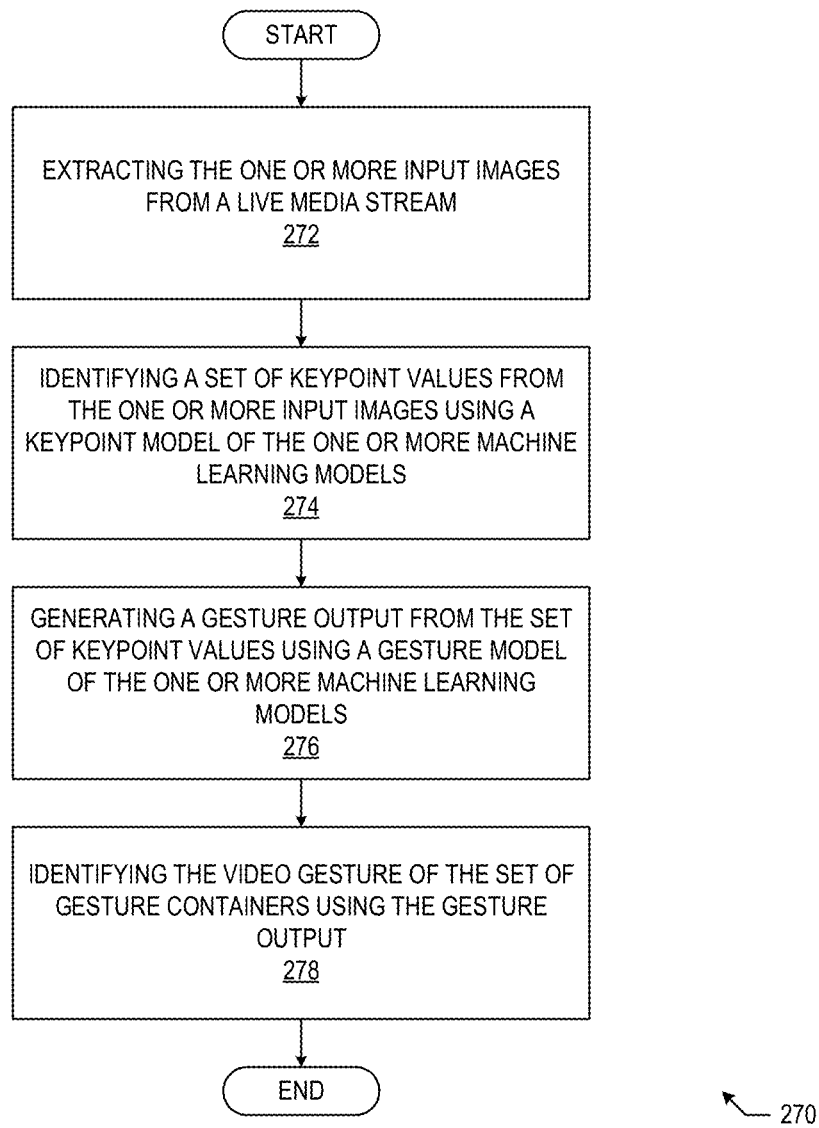

Turning to FIG. 2D, the process (270) extends Step 206 (of FIG. 2A) of detecting the performance of a video gesture. The detection may be performed on an endpoint and may be performed on a server that receives a video stream from an endpoint.

At Step 272, input images are extracted from a live media stream. The live media stream includes the data streams for the audio and video of a video conference. A video stream is extracted from the live media stream. In one embodiment, the extraction of the video stream includes identifying the video stream from the live media stream. The input images are extracted from the video stream. In one embodiment, the images are extracted using a decoding algorithm that decompresses the image from the video stream.

At Step 274, a set of keypoint values are identified from the one or more input images using a keypoint model of the one or more machine learning models. The keypoint model identifies a set of keypoint values for the locations of human body features (face, body, hands, etc.) from the input images. The keypoint model may be a two-dimensional model or a three-dimensional model and provide keypoint value that are two-dimensional coordinates or three-dimensional coordinates, respectively, At Step 276, a gesture output is generated from the set of keypoint values using a gesture model of the one or more machine learning models. The gesture output identifies the presence of one or more gestures in the input images. In one embodiment, the gesture value is a single number with a value ranging from 0 (gesture not present) to 1 (gesture present). In one embodiment, the gesture output is a vector with each element representing the presence (or not) of a different video gesture in the input images.

At Step 278, the video gesture is identified using the gesture output. The gesture output may identify one of multiple video gestures in which each video gesture corresponds to a gesture container. In one embodiment, the value in the gesture output that is closest to 1 may identify the video gesture.

FIGS. 3A through 3E show an example user interface (300) that creates customizable gesture commands. A user interacts with the user interface (300) to create video gesture data that includes gesture containers that define video gestures that may be performed by a user and recognized by a computing system and define the commands that are invoked in response to recognition of the performance of the video gesture.

Figure 3A:
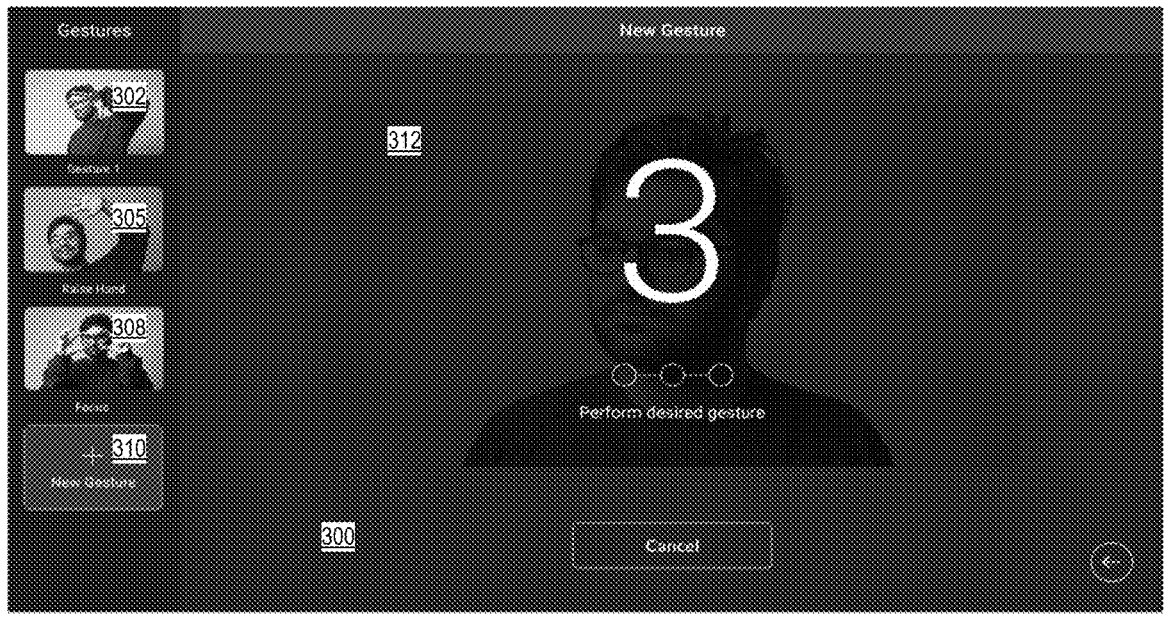
FIG. 3A, FIG. 3B, FIG. 3C, FIG. 3D, FIG. 3E, FIG. 4A, and FIG. 4B show examples in accordance with disclosed embodiments.

Turning to FIG. 3A, the user interface (300) includes the interface elements (302) through (310). The interface elements (302) through (308) are buttons (also referred to as thumbnail buttons) that identify different gestures that have been defined in the system. The user interface (300) is displayed on an endpoint and the video gesture may be created by the endpoint or by a server to which the endpoint is connected.

Each of the interface elements (302) through (308) includes a thumbnail of the gesture. The thumbnail may be a static image for a static gesture or a moving image for a dynamic gesture. In one embodiment, the moving image may move when a mouse cursor hovers over the corresponding interface element.

Each of the interface elements (302) through (308) includes a name. The names may be provided by the user as a user-friendly description of the gesture, the meaning of the gesture, the commands invoked by the gesture, etc.

Each of interface elements (302) through (308) may be selected. Selection of one of the interface elements (302) through (308) enables editing of the video gesture data (name, thumbnail, training images, etc.) for the video gesture corresponding to the selected interface element.

The interface element (310) is a button. Selection of the interface element (310) initiates the process of creating a new video gesture that the system will recognize.

After the interface element (310) is selected, the user interface (300) prompts the user. The user is prompted in the view (312) to perform a demonstration of the video gesture.

Figure 3B:

Turning to FIG. 3B, the view (312) of the user interface (300) is updated. The view (312) is updated to show the recording of the performance of the new video gesture.

Figure 3C:
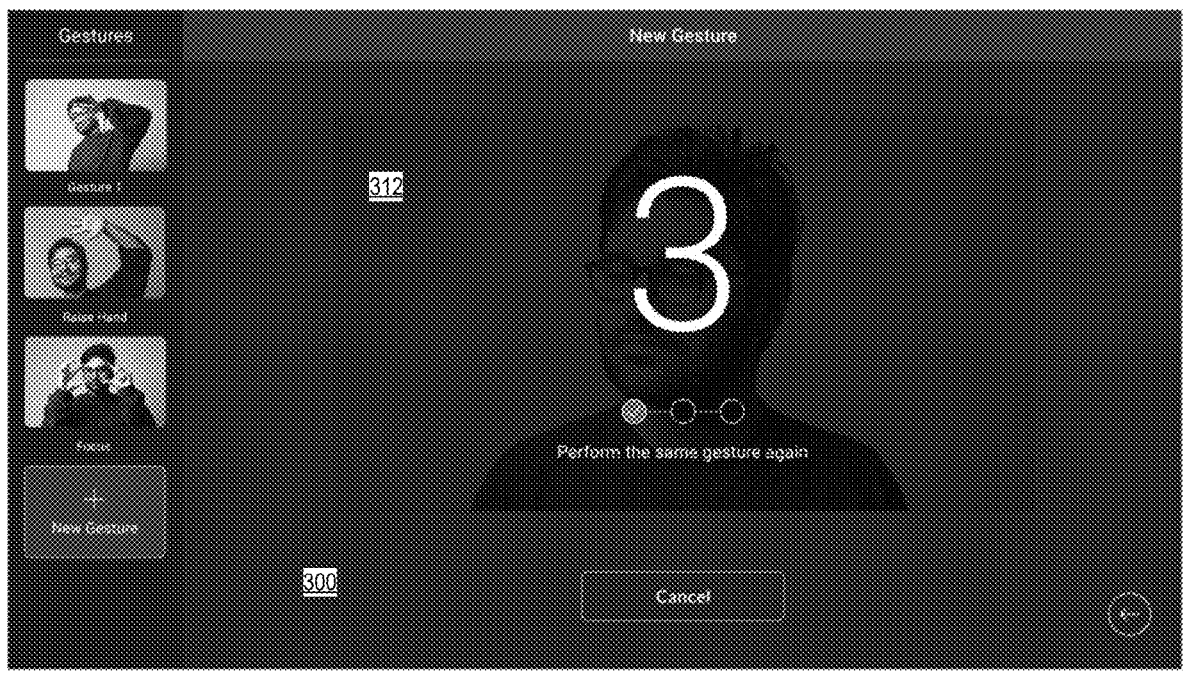

Turning to FIG. 3C, the view (312) of the user interface (300) is updated. The view (312) is updated to request the user to perform the gesture again for the endpoint to capture another training image.

Figure 3D:
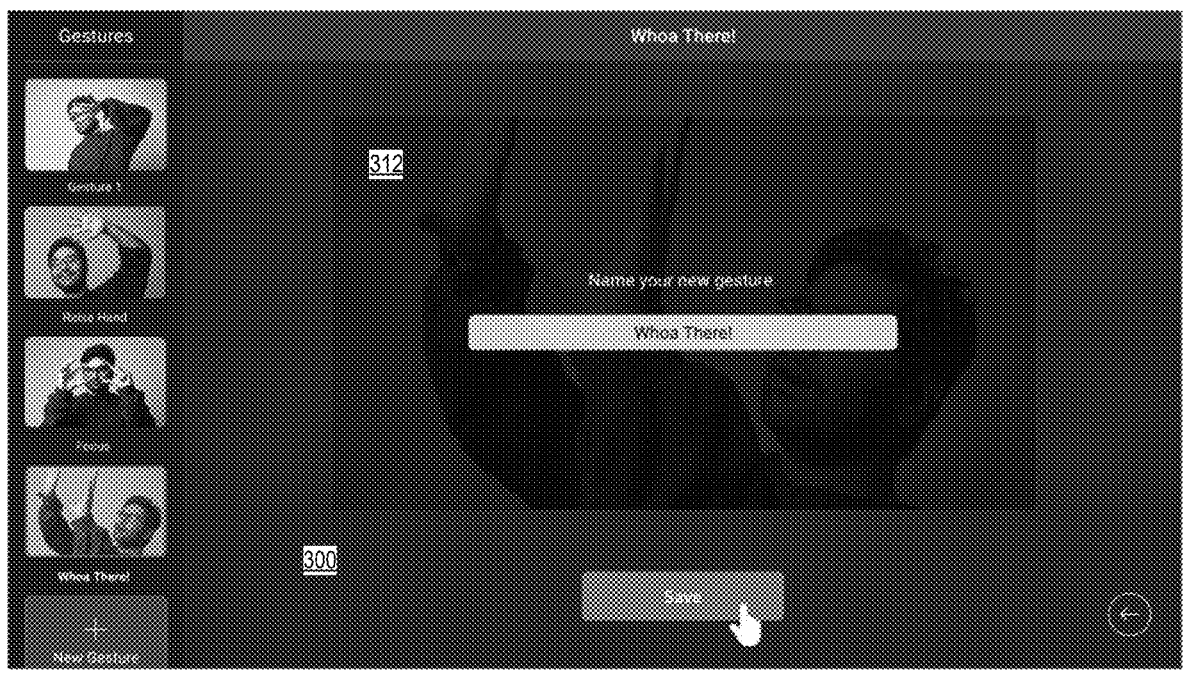

Turning to FIG. 3D, the view (312) of the user interface (300) is updated. After recording the training images, the view (312) is updated to request the name for the video gesture from the user. The user provides the name "Whoa There!" as the name for the video gesture.

Figure 3E:
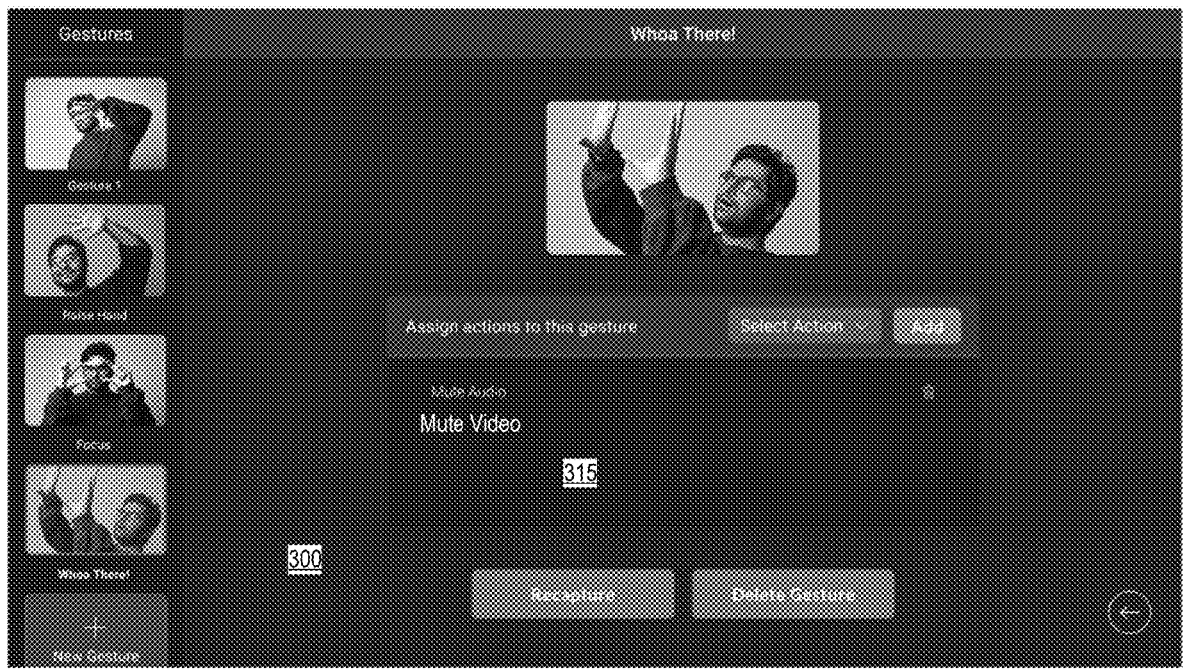

Turning to FIG. 3E, the user interface (300) is updated. After receiving a name for the video gesture, the user interface (300) is updated to display the interface element (315). The user interface element (315) displays the list of commands that will be invoked when the video gesture is recognized by the system. The user may add additional commands. Two commands are associated with the gesture to be invoked when the gesture is recognized by the system. The first command mutes the audio, and the second command mutes the video.

Figure 4A:
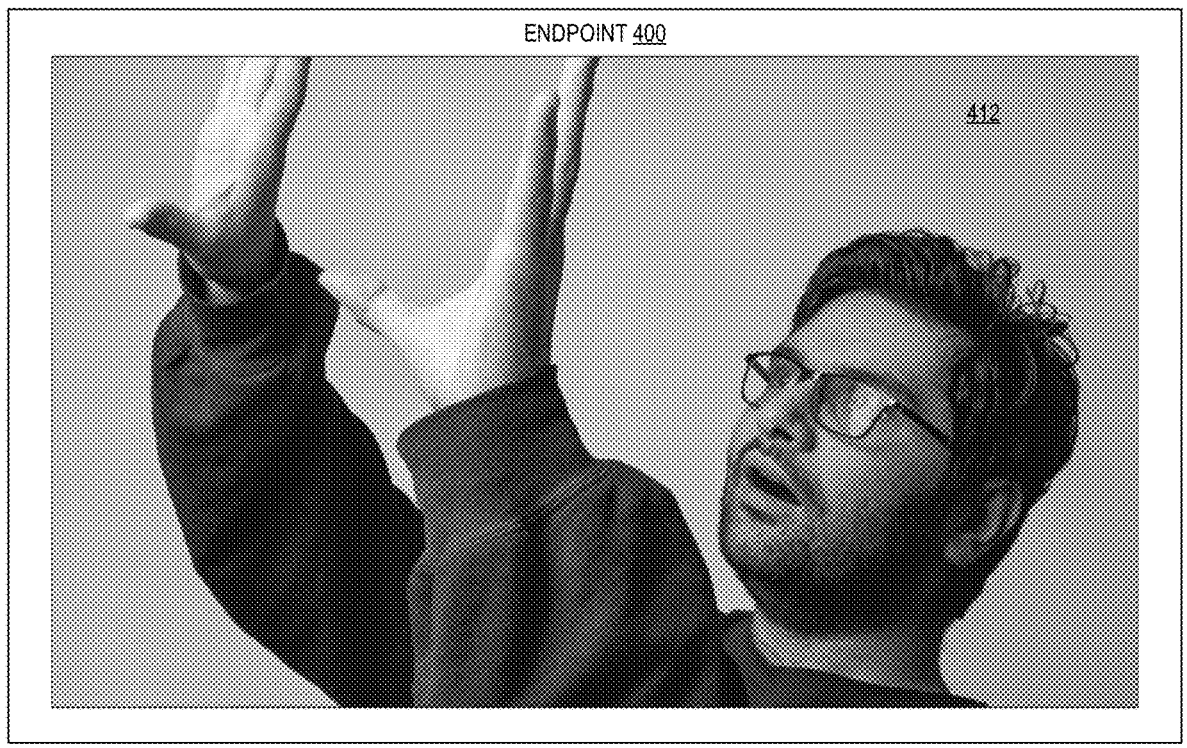
Figure 4B:
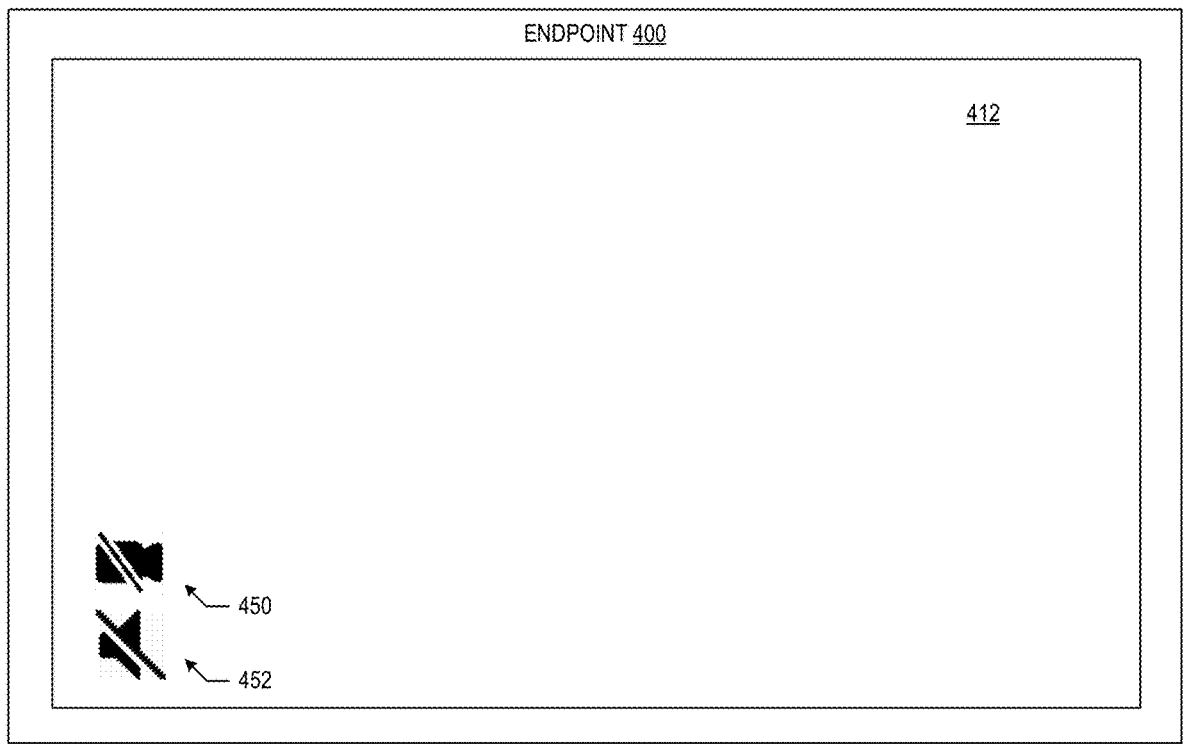

FIGS. 4A through 4B show the use of a customizable gesture command. A user operates the endpoint (400) to create a video conference with a remote endpoint. The endpoint (400) displays the view (412).

The view (412) shows the video stream captured by the endpoint (400) that is part of the live media stream of the video conference between the endpoint (400) and the remote endpoint. During the video conference, the endpoint recognizes the video gesture named "Whoa There!".

Turning to FIG. 4B, after recognizing the video gesture, the view (412) is updated. The view (412) is updated to mute the video, which is identified by the icon (450) and to mute the audio, which is identified by the icon (452). The endpoint (400) may still provide video and audio streams to the video conference. However, the video stream shows an empty screen (e.g., a black screen) and the audio stream has no sound.

Figure 5:
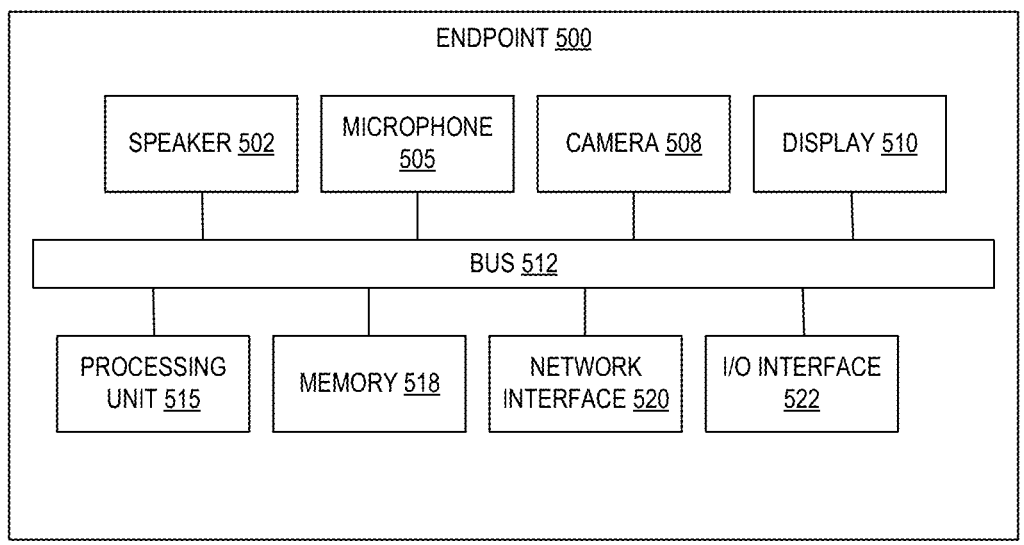
FIG. 5 shows an endpoint in accordance with disclosed embodiments.

FIG. 5 shows an example of an endpoint (500). The endpoint (500) is used to participate in video conferences. Embodiments of the endpoint (500) include video conferencing apparatuses, which may include mobile phones, laptop computers, desktop computers, tablet computers, video bars, etc. The endpoint (500) of FIG. 5 communicates with one or more remote endpoints over a network using the network interface (520). The endpoint (500) includes multiple hardware and software components.

The speaker (502) converts electrical audio signals into corresponding sound that may be heard by the users of the endpoint (500). The speaker (502) may be one of multiple speakers that are part of the endpoint (500).

The microphone (505) converts sound to corresponding electrical audio signals. The sound includes the speech of the users of the endpoint (500). The microphone (505) may be one of multiple microphones that are part of the endpoint (500).

The camera (508) converts light to corresponding electrical images and video. In one embodiment, the camera includes joints and motors to control the direction the camera is pointing and the amount of zoom of the camera. The camera (508) may be one of multiple cameras that are part of the endpoint (500).

The display (510) converts electrical signal to corresponding images that may be viewed by users of the endpoint (500). In one embodiment, the display (510) may be a touch sensitive display that converts touch inputs from a user to electrical signals. The display (510) may be one of multiple displays that are part of the endpoint (500).

The bus (512) is a communication system that transfers data between the components inside the endpoint (500). The bus (512) may use electrical or optical signals to transfer data between the components.

The processing unit (515) is a collection of digital circuits that process the data and information captured and used by the endpoint (500). The processing unit (515) may include one or multiple processors. The processing unit (515) executes the programs stored in the memory (518). The programs include software instructions in the form of computer readable program code that, when executed, cause the endpoint (500) to perform the operations of the embodiments of the disclosure.

The memory (518) is a collection of circuits that are used to store information used by endpoint (500). The memory (518) stores programs and data that are executed and used by the processing unit (515). The memory (518) may include volatile memory and nonvolatile memory.

The network interface (520) is the point of connection between the endpoint (500) and other networks and endpoints. The network interface (520) may include interfaces for wired networks (e.g., ethernet) and wireless networks (e.g., wireless local area network (WLAN), mobile phone networks, etc.).

The input/output (I/O) interface (522) is the point of connection between the endpoint (500) and I/O devices. The input/output (I/O) interface (522) may include physically connected interfaces (e.g., universal serial bus (USB)) and wireless interfaces (e.g., personal area networks (PAN)). The input/output (I/O) interface (522) may connect the endpoint to keyboards and mice, as well as to additional speakers, microphones, cameras, displays, etc.

Specific embodiments of the invention are described above in detail with reference to the accompanying figures. Like elements in the various figures are denoted by like reference numerals for consistency.

The embodiments of FIGS. 2A through 2D may be combined and may include or be included within the features and embodiments described in the other figures of the application. The features of FIGS. 2A through 2D are, individually and as an ordered combination, improvements to user interfaces and machine learning technology. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively.

In the above detailed description of embodiments of the disclosure, numerous specific details are set forth in order to provide a more thorough understanding of the invention. However, it will be apparent to one of ordinary skill in the art that embodiments of the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

While the disclosure describes a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising operations of:
    storing, by a computing system to a gesture container, training data comprised of:
        a video gesture, and
        a command linked to the video gesture;
    training, by the computing system when the computing system processes the training data, a machine learning model to detect the video gesture;
    detecting, by the computing system when the computing system trains the machine learning model, the video gesture in a live media stream; and
    executing, by the computing system in response to the computing system detecting the video gesture in the live media stream, the command,
    wherein training the machine learning model comprises:
        generating outputs from the training data using the machine learning model, and
        updating the machine learning model by measuring error of the outputs generated from the training data, and
    wherein detecting the video gesture further comprises:
        identifying, in one or more input images using a keypoint model of the machine learning model, locations of anatomical landmarks on a human body,
        processing a gesture model of the machine learning model to generate a gesture output from the locations, and
        identifying, using the gesture output, the video gesture in the live media stream.

2. The method of claim 1, wherein storing the video gesture and the command further comprises:
    capturing, by the computing system, one or more training images with an endpoint.

3. The method of claim 1, wherein storing the video gesture and the command further comprises:
    identifying, by the computing system, one or more of a model type and a gesture type in response to receiving a set of model selections;
    receiving, by the computing system, one or more training images captured with an endpoint; and
    assigning, by the computing system, the command to the video gesture in response to receiving a set of command selections.

4. The method of claim 1, wherein storing the video gesture and the command further comprises:
    assigning, by the computing system to the video gesture from the gesture container, the command to mute an audio stream; and
    assigning, by the computing system to the video gesture from the gesture container, a second command to mute the live media stream.

5. The method of claim 1, wherein storing the video gesture and the command further comprises:
    assigning, to the video gesture from the gesture container, a command to zoom a view towards a location of the video gesture; and
    assigning, to the video gesture from the gesture container, a command to initiate a tracking function.

6. The method of claim 1, wherein storing the video gesture and the command further comprises:
    identifying a model type as one of a hand model, a body model, and a face model; and
    identifying a gesture type as one of a static gesture and a temporal gesture,
    wherein the static gesture is linked to a support vector machine of the machine learning model and the temporal gesture is linked to a long short term memory (LSTM) of the machine learning model.

7. The method of claim 1, wherein storing the video gesture and the command further comprises:
    selecting a training image as a thumbnail image of the gesture container in response to receiving a thumbnail selection.

8. The method of claim 1, wherein training the machine learning model further comprises:
    receiving the training data; and
    augmenting the training data to include augmented training data created using one or more of a set of affine transformations and a generative adversarial network (GAN).

9. The method of claim 1, wherein detecting the video gesture further comprises:
    extracting one or more input images from the live media stream.

10. The method of claim 1, wherein the machine learning model comprises one of a two-dimensional model and a three-dimensional model.

11. The method of claim 1, wherein executing the command further comprises:
    muting, as a first command, an audio stream for the live media stream; and
    muting, as a second command, the live media stream.

12. The method of claim 1, wherein executing the command further comprises:
    zooming, as a first command, a view towards a location of the video gesture; and
    initiating, as a second command, a tracking function.

13. A non-transitory computer readable medium comprising computer readable program code, the computer readable program code when executed by a processor causing a computing system to perform a method comprising operations of:

storing, by the computing system to a gesture container, training data comprised of:
   a video gesture, and
   a command linked to the video gesture;
training, by the computing system when the computing system processes the training data, a machine learning model to detect the video gesture;
detecting, by the computing system when the computing system trains the machine learning model, the video gesture in a live media stream; and
executing, by the computing system in response to the computing system detecting the video gesture in the live media stream, the command,
wherein training the machine learning model comprises:
   generating outputs from the training data using the machine learning model, and
   updating the machine learning model by measuring error of the outputs generated from the training data, and
wherein detecting the video gesture further comprises:
   identifying, in one or more input images using a keypoint model of the machine learning model, locations of anatomical landmarks on a human body,
   processing a gesture model of the machine learning model to generate a gesture output from the locations, and
   identifying, using the gesture output, the video gesture in the live media stream.

14. A computing system comprising:
a processing circuitry electrically connected to memory,
wherein the memory is to store training data comprised of:
   a video gesture, and
   a command linked to the video gesture, and
wherein the processing circuitry is to:
   extract, from a live media stream, an image,
   process, to train a machine learning model, the training data,
   identify, in the image when the processing circuitry trains a keypoint model of the machine learning model, locations of anatomical landmarks on a human body,
   generate, from the locations when the processing circuitry trains a gesture model of the machine learning model, a gesture output,
   update, when the processing circuitry generates the gesture output, machine learning model by measuring error of the gesture output,
   identify, when the processing circuitry generates the gesture output, the video gesture in the live media stream, and
   execute, when the processing circuitry identifies the video gesture, the command.

15. The computing system of claim 14, wherein the memory is to store:
   the machine learning model or a reference to the machine learning model.

16. The computing system of claim 14, wherein the memory is to:
   store one or more training images captured with an endpoint.

17. The computing system of claim 14, wherein the processing circuitry is to:
   select, as a thumbnail image of the video gesture when the processing circuitry receives a thumbnail selection, a training image.

18. The computing system of claim 14, wherein the processing circuitry is to:
   identify, when the processing circuitry generates the gesture output, the video gesture as one of a static gesture and a temporal gesture,
   wherein:
      the static gesture is linked to a support vector machine of the machine learning model, and
      the temporal gesture is linked to a long short term memory (LSTM) of the machine learning model.

19. The computing system of claim 14, wherein the processing circuitry is to:
   augment the training data to include augmented training data created using one or more of:
      a set of affine transformations, and
      a generative adversarial network (GAN).

20. The computing system of claim 14, wherein the command controls an endpoint to perform an operation from the group consisting of:
   muting the live media stream,
   muting an audio stream for the live media stream,
   zooming a view towards a location of the video gesture, and
   initiating a tracking function.

* * * * *